UNITED STATES PATENT OFFICE.

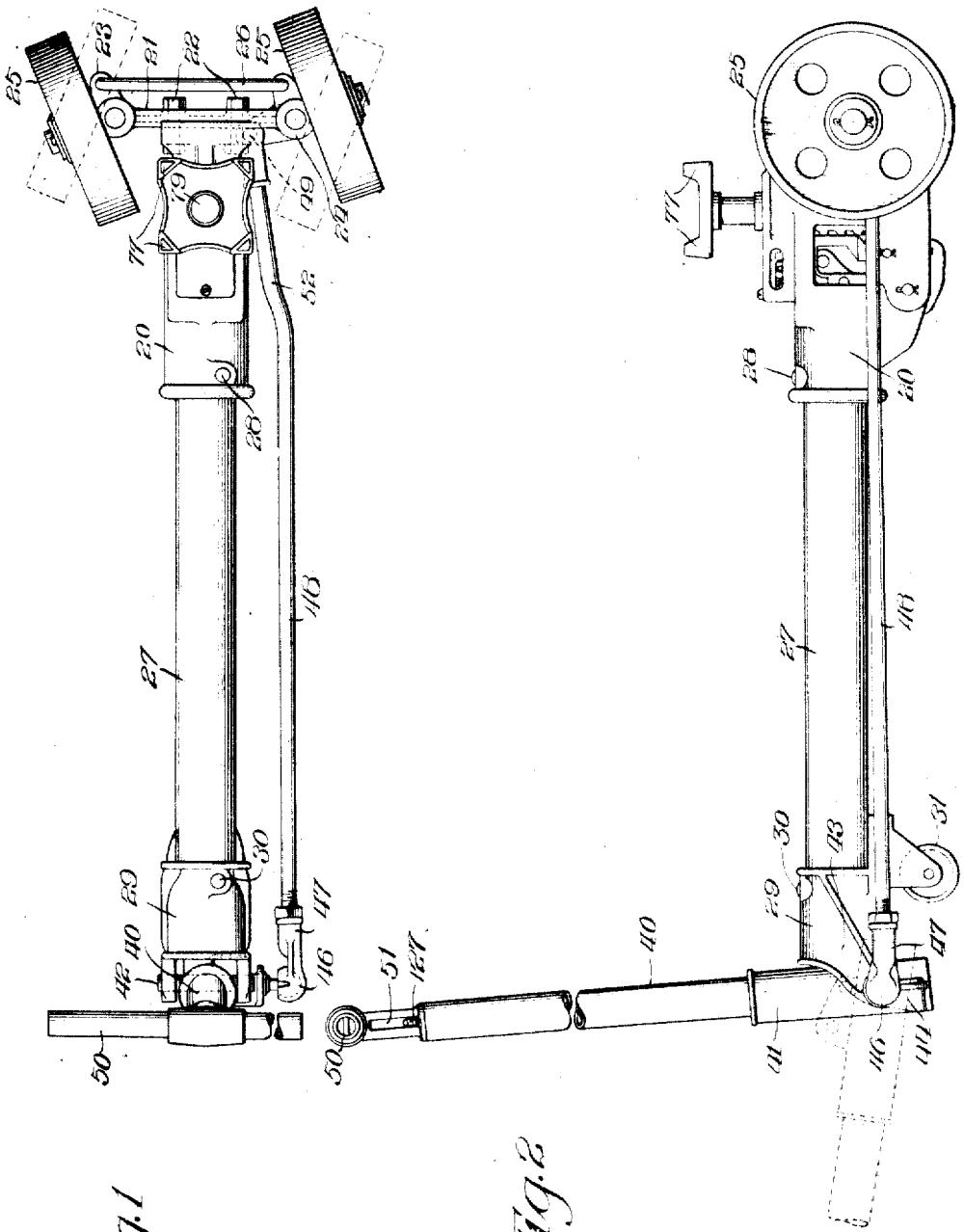

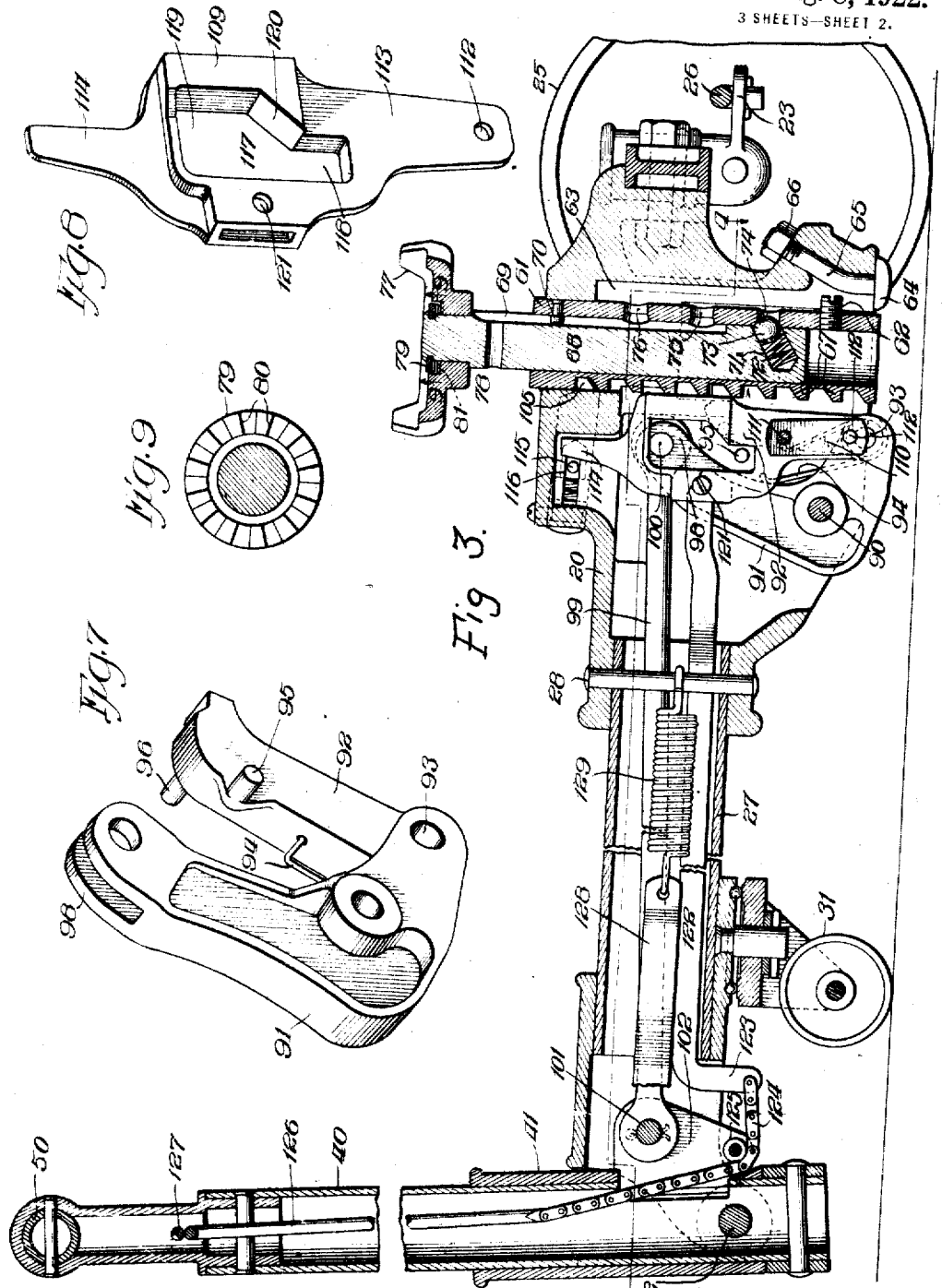

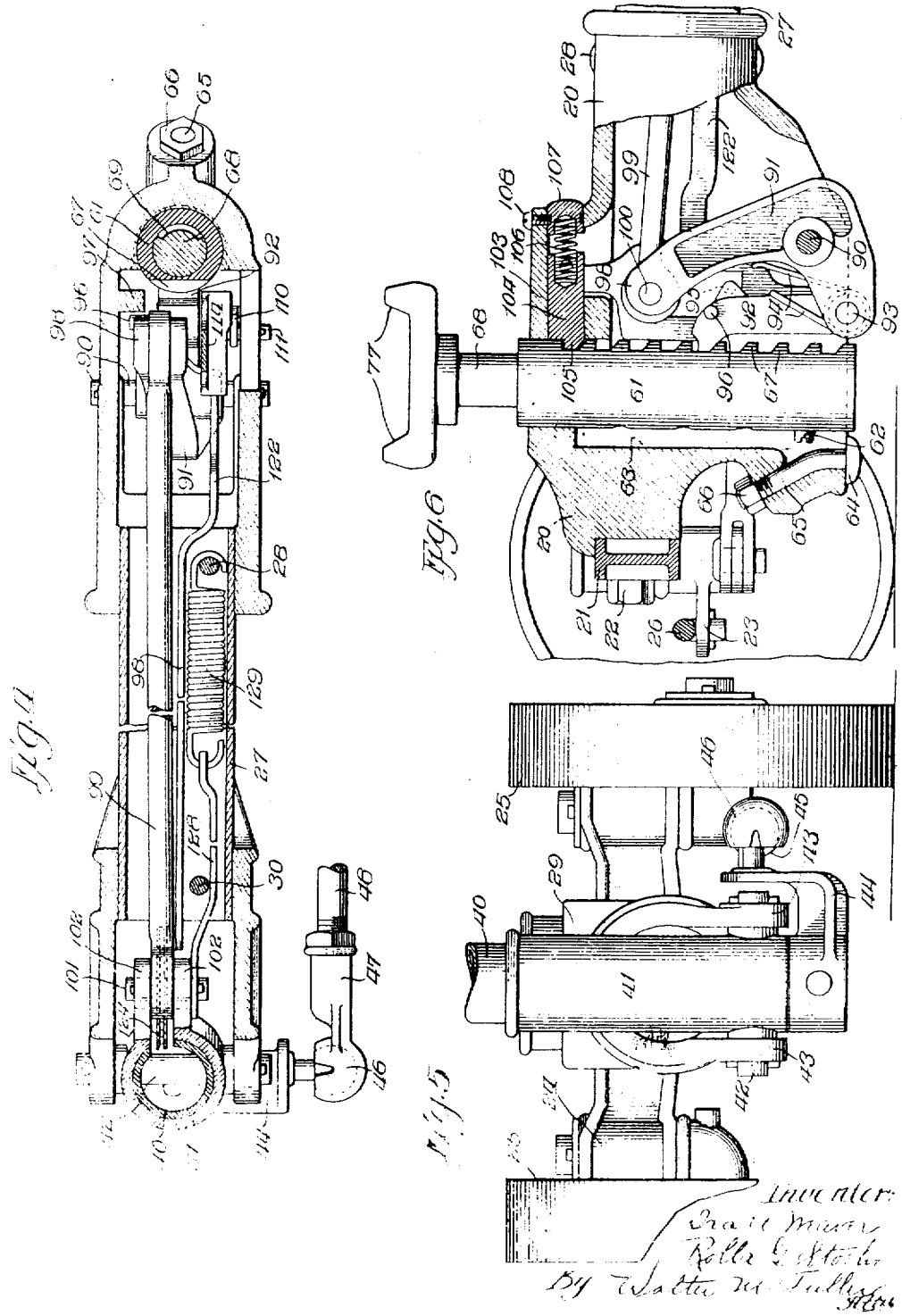

IRA A. WEAVER AND ROLLA G. STOEHR, OF SPRINGFIELD, ILLINOIS, ASSIGNORS TO THE WEAVER MANUFACTURING COMPANY, OF SPRINGFIELD, ILLINOIS, A CORPORATION OF ILLINOIS.

TRUCK JACK.

1,424,962.  Specification of Letters Patent.  Patented Aug. 8, 1922.

Application filed July 9, 1919. Serial No. 309,593.

*To all whom it may concern:*

Be it known that we, IRA A. WEAVER and ROLLA G. STOEHR, both citizens of the United States, residing at Springfield, in the county of Sangamon and State of Illinois, have invented certain new and useful Improvements in Truck Jacks, of which the following is a specification.

Our invention relates to lifting-jacks of the truck or wheeled type especially adapted for use with automobiles and the like, one object of the invention being the provision of an appliance of this character equipped with a handle by which the truck may be moved, the handle also by suitable connections being adapted to steer the wheels of the truck and also operate the jack. Such handle has two independent movements, one governing the steering of the wheels, and the other the manipulation of the jack. The apparatus as a whole possesses many features of novelty both in structure and mode of operation by means of which various other desirable objects are attained, all as will be readily understood by those skilled in the art from a consideration of the preferred embodiment of the invention illustrated in the accompanying drawings and described in detail below. For example, the improved truck-jack is of much and valuable service in shifting or moving pleasure automobiles or trucks in restricted or confined spaces in garages, show-rooms, service-stations, tire-shops, etc., the apparatus constituting a strong, compact, easily-operated, quick-acting, lifting and transporting jack. Such combined truck and jack is so designed and constructed that but little space is required for its application to the automobile and its manipulation, the handle being fitted with a balance spring which normally swings it upwardly out of the way and out of danger of being run over by other vehicles. The jack proper is desirably made of two telescoping parts, thereby enlarging or increasing its range of lifting action, the release latch used when lowering the load, being located on the handle and easily accessible.

Throughout the various views of the drawings depicting a preferred and desirable embodiment of this invention, like reference characters refer to the same parts.

In these drawings:

Figure 1 is a plan view of the appliance, a portion of the handle being broken away and the steering of the wheels being indicated by a showing in dotted lines;

Figure 2 is an elevation of the structure of Figure 1 and illustrates the manner in which the handle may be swung up or down in operating the jack;

Figure 3 is an enlarged central vertical section through the apparatus, portions of the same being broken away to more clearly illustrate the exact construction;

Figure 4 is a fragmentary horizontal section on line 4—4 of Figure 3;

Figure 5 is a fragmentary elevation of the handle end of the apparatus;

Figure 6 is a fragmentary vertical section through the jack portion of the appliance;

Figure 7 is a perspective view of the bell-crank and pawl for lifting the load;

Figure 8 is a perspective view of the release member employed in the pack; and

Figure 9 is a horizontal section on an enlarged scale on line 9—9 of Figure 3.

Referring to these drawings, it will be seen that the improved combined truck and jack comprises a hollow-casting 20 of somewhat peculiar shape to which a transverse axle 21 is bolted at 22, 22, such axle at its two ends being equipped with pivoted steering-knuckles 23, 24, equipped with carrying-wheels 25, 25, the two knuckles being connected together, as is customary in automobiles, with a link 26, whereby steering movements transmitted to the knuckle 24 and its wheel will be simultaneously communicated to the companion knuckle and wheel.

The truck or wheeled supporting portion of the apparatus includes additionally a hollow tube 27 secured, as by a vertical pin 28, in the end portion of casting 20, and fastened at its other end in a smaller casting 29 by means of a similar securing pin 30. As is clearly shown in Figure 2, this hollow member 29 is supported on a caster-wheel 31 rockingly mounted on the casting so that it is free to turn around its own horizontal axis and also around a vertical axis. Thus, it will be appreciated that the entire structure is supported on the two steering-wheels 25, 25, and the somewhat-distant associated caster-wheel 31.

The appliance is provided with a hollow handle-staff 40 having its lower portion extended through and revoluble in a socket member 41 pivoted or hinged on a cross-pin 42 supported in downwardly-extended spaced ears 43, 43, constituting integral parts of the casting 29. The lower end of this handle-shaft has an upwardly-bent arm 44 pinned or otherwise fixed thereto, such arm carrying a ball 45 accommodated in a correspondingly-shaped socket 46 of an end member 47 having a screw-threaded adjustable engagement with a bent connecting steering-rod 48 having pivotal connection at 49 with the steering-knuckle 24.

The upper end of the handle staff or arm is equipped with a transverse handle proper 50 pinned or otherwise conveniently fixed thereto, the shank of the handle being slotted at 51 for a purpose hereinafter indicated.

It will be understood that by turning this handle 50 and its arm 44, the pair of wheels 25, 25, may be steered or turned angularly, the connecting-rod being inwardly bent or deflected at 52 to give the wheel 25 on its side of the truck a substantial movement without interference therewith. When the handle 50 is at right-angles to the longitudinal axis of the truck, the wheels will be parallel to such axis and the truck as a whole if moved will travel in a straight path. Under these circumstances the ball and socket connection 45, 46, will be in alignment or register with the axis of the horizontal cross-pin 42 on which the handle-arm is hinged and the swinging of the handle in a vertical plane will have no effect on the steering-wheels. When the handle 50 is turned to steer the wheels, the ball and socket joint is, of course, shifted out of such register.

Turning now to the lifting-jack portion of the appliance, it will be observed that the top wall of casting 20 is provided with a vertical, cylindrical passage slidingly receiving a vertically-adjustable sleeve 61 equipped with an outstanding pin 62 traveling in a vertical groove 63 inside of the casting, thus preventing rotation of the sleeve, permitting its elevation and descent, but also preventing its upward withdrawal from the appliance. The bottom end of groove 63 is covered or closed by the head 64 of an inclined bolt 65 equipped with a retaining nut 66, such bolt being accommodated in a hole through the casting for that purpose. By unscrewing the nut and removing the bolt the sleeve 61 may be withdrawn from the casting 20 downwardly through its open bottom. On one side this sleeve or tube has a series of transverse, spaced teeth 67 with horizontal lower surfaces and inclined upper surfaces, all as is clearly illustrated in Figure 3.

Internally, such sleeve accommodates a cylindrical shaft or post 68 longitudinally-grooved at 69, the groove loosely receiving a stop-pin 70 fixed to the top portion of the sleeve 61 and projecting inwardly through its wall. This pin not only prevents an upward removal of the post from the sleeve by reason of the engagement of the pin with the end wall of the groove, but it additionally limits the turning of the post in the sleeve, the pin being somewhat less in diameter than the width of the groove, thus allowing a small extent of rotary movement of the post in the sleeve for a purpose hereinafter described.

The telescopic arrangement of the post and sleeve is provided with the object of expanding or enlarging the lifting capacity of the jack. For low bodies the post would be received entirely within the sleeve, but for higher bodies the post may be caused to extend upwardly out of the sleeve varying amounts, being held in such elevated positions by a ball-catch construction comprising a downwardly-inclined cylindrical hole 71 in the lower part of the shaft or post 68, such cavity accommodating a coil expansion-spring 72 tending to push upwardly and outwardly a ball 73 of substantially the diameter of the recess. Sleeve 61 has a plurality of vertically-spaced holes 74, 75, and 76 through its wall of slightly less caliber than the diameter of the ball. Under normal conditions with the shaft or post 68 held in elevated position, one of the holes in the sleeve is in register with the cavity 71 of the post, the ball being partially accommodated in these registering recesses and acting as a stop or support on which the jack-post rests. To change the degree of extension of the jack-post from the sleeve, that is, to modify the height of the post so as to properly engage the portion of the automobile to be lifted, the operator manually raises the post slightly, and, by reason of the inclination of the aperture in the post, such movement automatically retracts the ball from the opening of the sleeve in which it resides, thus permitting free and unrestrained elevation of the jack-post. Then by turning the post slightly so as to temporarily maintain the ball out of register with the line of holes in the sleeve, the post may be shifted vertically the desired amount and then turned angularly to bring the ball into register with the opening corresponding to such height, the ball automatically entering that particular sleeve opening under the action of its spring and then constituting a rest or support for the post in its new adjusted position.

At its top the jack-post carries a pronged work-engaging member 77 revoluble on the post, its height position being determined by the shoulder 78 on the post. The upper reduced part of the post is equipped with a fixed washer 79 having teeth 80 on its under surface and the underlying portion of the member 77 is provided with similar teeth 81. Under normal conditions when the member 77 rests in revoluble condition on the shoulder 78, these two sets of teeth are out of engagement. When, however, it is desired to adjust the height of the jack post in the sleeve in the manner described above, a slight lifting of the member 77 causes a direct positive engagement between itself and the post by reason of the intermatching teeth so that the turning action of the post may be effected without touching the post proper, it being merely necessary to adjust the post by manipulation of the member 77 and the teeth described.

In order to control the step-by-step elevation of the jack sleeve and post and their descent the appliance is provided with the following instrumentalities:

On a cross-pin 90 supported in the parallel side-walls of the casting 20 a bell-crank 91 is fulcrumed, the shorter bifurcated arm thereof having a pawl 92 pivoted thereon on a pin 93, a coil-spring 94 encircling the hub of the pawl and bearing at its two ends on the longer arm of the bell-crank and on the pawl respectively, the pawl having two transverse cylindrical extensions or pins 95 and 96 respectively, the latter normally traveling on or adjacent to a vertical surface 97 on the interior of the casting 20, thus limiting the swinging of the pawl toward the teeth of the jack-sleeve. The bifurcated end portion 98 of the longer arm of the bell-crank is connected by a link 99 pivoted on a pin 100 in the bell-crank to the socket member 41, being pivoted on a cross-pin 101 supported in parallel brackets 102, 102, integral with the member 41, the end portion of the link being received between such brackets. It will be perceived, therefore, that when the handle staff 40 is swung downwardly on its pivotal support 42 as shown in dotted lines in Figure 2, the shorter arm of bell-crank 91 and the pawl which it carries will be elevated, and if, during such elevation, the pawl engages one of the teeth of the jack-sleeve, it will lift the latter.

To maintain the jack-sleeve in elevated position during the descent of the pawl or dog 92 for engagement with a lower tooth, the apparatus is provided in a slightly-inclined cylindrical cavity 103 in the casting 20 with a plunger 104 having a tooth 105 to co-operate with the teeth of the jack-sleeve 61, the dog having a flat upper surface and a beveled under surface. Such plunger and its dog is pressed inwardly toward the sleeve by a spring 106 accommodated in part in a recessed end of the plunger and in part in a cavity in a closure-plug 107 held in place by a screw 108 and blocking or closing the end of the opening 103.

A release yoke member 109 of the form and style shown in Figure 8 is supported at its lower end by a link 110 pivotally mounted at 111 on and inside of the corresponding side-wall of the casting 20, such link at its lower end having a pivotal connection at 112 with a depending extension 113 of the member 109, the latter element having also an upwardly-extended finger 114 positioned in front of a transversely extending pin 115 carried by the plunger 104 and slidable in a suitable slot 116 in the casting, the pin thus preventing the plunger and its tooth from turning in its bearing. If, therefore, the yoke-member 109 is swung away from the sleeve 61, its end 114 will retract the locking or holding tooth 105 away from the teeth of the jack-sleeve provided the load has been lifted off of the tooth by the companion lifting dog or pawl 92. Member 109 has an opening 117 therethrough with a constricted or narrow lower portion 118 with straight edges and a wider upper portion 119 the member possessing an inclined or cam surface 120 at the point indicated where the narrower part widens into the larger portion, the hole 117 accommodating the pin 95 of the lifting pawl or dog, as illustrated in Figure 3.

In order that this pivotally-mounted element 109 may be manually retracted to effect the lowering of the load, it is pivotally connected at 121 with a bent pull-bar 122, the depending end 123 of which is associated with one end of a chain 124 passing around an anti-friction roller 125 supported between the brackets 102, the other end of the chain being connected to a release rod 126 having a latch end or handle portion 127 extended out sidewise through the slot 51 of the shank of the handle 50. Roller 125 is so positioned during the upward and downward swinging of the whole handle or lever structure 41, 40, 50, that the chain will occupy such position as to effect no movement of the link 122. Stated somewhat differently, such link and the release member 109 are manipulated only when the catch or handle 127 is pulled upwardly or outwardly toward the cross-handle 50.

In order that the hinged or fulcrumed handle may automatically assume a substantially-vertical position when released and thus keep it out of the way, the pin 101 which passes through the two brackets 102 is pivotally associated with the end portion of a bent bar 128, the other end of which is connected to the pin 28 by a coil contractile-spring 129. This spring is of such strength that when the handle is freed it will automatically swing upwardly gently to the full line position illustrated in Figure 2, thus carrying it out of harm's way and hence unlikely to be run over by a vehicle. Such raised position of the handle partakes somewhat of a safety precaution also because under such circumstances the lower lifting pawl or dog will be in tooth-engaging position. Consequently, if accidentally the retaining dog 105 were released the lower dog would hold the load and there would be no sudden dropping of the load or violent upward swinging of the handle with possible danger to the operator and likelihood of damage to the car.

The operation of this appliance takes place practically as follows:

Assume for example that an automobile is close in the corner of a building parallel to one side, head foremost against the other wall, and cannot be moved back by reason of some obstruction, so that it is necessary to shift laterally or sidewise either the rear or front end thereof. In case it is the front end, the truck-jack is pushed or guided in under the front portion of the vehicle so as to bring the jack proper beneath the center of the front axle. This can be readily done by pushing in the truck diagonally from the side of the machine behind one of the front wheels. Assuming that the post or standard 68 has been previously elevated in the sleeve 61 and locked by the ball 73 at the proper height in the manner indicated, the operator rocks the hinged handle or fulcrumed lever 41, 40, 50 downwardly around its pivotal support 42. Each time it swings down the bell-crank 91 is turned so as to raise the pawl or dog 92 and this by engaging one of the teeth 67 of the sleeve 61 elevates the latter one tooth or more. During this upward travel the tooth 105 is forced back by the inclined upper surface of the tooth beneath it and as soon as such tooth has passed the catch 105 the latter, under the action of spring 106, automatically slides in under the tooth and retains the sleeve in its new adjusted position, so that during the upward swinging of the handle, which causes the pawl 92 to descend, the jack-post and sleeve will remain in their elevated position. This swinging of the handle up and down is continued until the load is lifted sufficiently, or, as in the case assumed, until the wheels of the vehicle are raised from the floor. Then the handle 50 is turned on its own axis so as to cant the wheels 25, 25, to bring them into parallel relation with the front axle of the automobile. Now the front portion of such automobile can be readily moved sidewise out of the corner, its weight being carried by the steering-wheels 25, 25, and the caster-wheel 31, and in this way the automobile can be extricated from its confined position.

To lower the released or moved automobile to the floor again, the handle 50 is turned so that the wheels 25 will be parallel to the longitudinal axis of the appliance and the handle 41, 40, 50, is rocked up and down, the release latch or trigger 127 being pulled at the same time, which swings the release yoke rearwardly pivoting about the pin 105, now held from retraction by the weight of the load, the lower end of the release yoke moving back by reason of its link mounting. While the member 109 is thus held back, the lifting-dog 92 during its ascent is prevented from swinging forwardly into engagement with the sleeve teeth by reason of its sliding along the front wall of the lower constricted part of the opening of the release member until it is near the upper end of its travel when it comes under a tooth and lifts it slightly, thereby relieving the retaining dog 105 from the weight of the load. Thereupon, owing to the pull through handle 127 on member 109, the latter is retracted at its upper end, drawing back catch 105 and permitting the sleeve and load to descend with dog 92 during the upward swinging of the handle. During such descent, the pin or lug 95 travels substantially vertically and by engagement with the sloping or cam surface 120 draws member 109 forwardly even though the operator may be pulling on trigger 127, thereby freeing dog 105 in time for it to engage beneath one of the sleeve teeth to hold the load during the next ascending movement of the lifting dog. By these means the load is lowered step by step during the rocking of the lever handle and the retraction of the handle 127. The above described action concerning the proper timed release of dog or catch 105 is conditioned upon the load or weight imposed on the toothed or notched sleeve and as soon as such load is removed, as by the automobile wheels again resting on the floor, the pull on handle 127 will simultaneously retract or release both dogs and the sleeve will drop immediately to its lowermost position which action is, of course, desirable.

Inasmuch as trucks have low bodies and automobiles are frequently equipped either at the front or rear with bumpers and low hanging reserve rims or tires which would prevent a full rocking movement of the handle lever, the jack is so constructed that the handle need be swung only through the lower part of its range of movement to carry out the load lifting and lowering operations.

From an understanding of the construction and mode of operation of this particular embodiment of the invention many advantageous uses of the improved appliance will suggest themselves to those skilled in this art as will also several minor mechanical changes or modifications in the device, all of which fall within the scope of the invention as defined by the appended claims. Stated somewhat differently, the invention is not confined and restricted to the precise and exact features of construction presented, these being subject to minor and substantial changes without departure from the spirit and essence of the invention.

We claim:

1. In an appliance of the character described, the combination of a truck having a caster-wheel and rotatable steering means near one end of the truck, a lifting-jack on said truck, a handle movably mounted on said truck near the other end thereof, means connecting said handle and jack whereby the former may operate the latter, and means permanently connecting said handle and steering means whereby the handle may turn and steer such means, substantially as described.

2. In an appliance of the character described, the combination of a truck having a caster-wheel and a pair of steering-wheels each constructed to swing about a vertical axis near one end of the truck, a lifting jack on said truck, a handle rockingly mounted on said truck near the other end thereof, means connecting said handle and jack whereby the former may operate the latter, and means connecting said handle and steering-wheels whereby the handle may turn and steer such wheels, substantially as described.

3. In a truck-jack of the character described, the combination of a wheeled truck having steering-wheel means near one end of the truck, a lifting-jack on said truck, a handle movably mounted on said truck near the other end thereof, means constantly operatively connecting said handle and jack whereby the former may actuate the latter, and means connecting said handle and steering-wheel means whereby the former may steer the truck by turning said means, substantially as described.

4. In a truck-jack of the character described, the combination of a wheeled truck having a pair of steering-wheels, near one end of the truck, a lifting-jack on said truck, a handle movably mounted on said truck, near the other end thereof means constantly operatively connecting said handle and jack whereby the former may actuate the latter step by step, and means connecting said handle and steering-wheels whereby the former may steer the truck by turning said wheels, substantially as described.

5. In a truck-jack of the character described, the combination of a wheeled truck having carrying steering-wheel means near one end and a carrying wheel near its other end, a lifting-jack on said truck, a handle movably mounted on said truck near the end thereof remote from said steering-wheel means, means connecting said handle and jack whereby the former may operate the latter, and means connecting said handle and steering-wheel means whereby the handle may turn and steer such means, substantially as described.

6. In a truck-jack of the character described, the combination of a wheeled truck having a pair of carrying steering-wheels near one end and a caster carrying wheel near its other end, a lifting-jack on said truck, a handle rockingly mounted on said truck near the caster wheel end thereof, means connecting said handle and jack whereby the former may operate the latter, and means connecting the handle and steering-wheels whereby the handle may turn and steer such wheels, substantially as described.

7. In a truck-jack of the character described, the combination of a wheeled truck having pivotally-mounted steering-wheel means near one end of the truck, a lifting-jack on said truck, a handle rockingly mounted on said truck near the other end thereof for up and down movement, means connecting said handle and jack whereby the latter is raised step by step on the downward movements of said handle, and means connecting said handle to said steering-wheel means whereby the latter may be turned by the handle to effect the steering operation, substantially as described.

8. In a truck-jack of the character described, the combination of a wheeled truck having pivotally-mounted steering-wheel means, near one end of the truck, a lifting-jack on said truck, a handle mounted on said truck near the other end thereof to have two different movements, means connecting said handle and jack whereby the latter is raised step by step during one of the movements of the handle, and means connecting said handle to said steering-wheel means whereby the latter may be turned during the other movement of the handle to effect the steering operation, substantially as described.

9. In an appliance of the character described, the combination of a wheeled-truck, a lifting-jack on said truck, a handle for the truck, a hinge mounting for said handle permitting it to swing on the hinge and to turn on its own axis, means connecting said handle with said jack whereby rocking of the handle on its hinge operates the jack, and means connecting said handle to a wheel of the truck whereby turning of the handle on its own axis steers the wheel, substantially as described.

10. In a truck-jack of the character described, the combination of a wheeled-truck having pivotally mounted steering-wheel means near one end of the truck, a lifting-jack on said truck, a handle mounted on said truck near the other end thereof to have two different movements, means constantly operatively connecting said handle with said jack whereby one of said movements of the former operates the jack, and means connecting said handle to said steering-wheel means whereby the other movement of the handle effects the steering operation, either movement of the handle having substantially no effect on the results of the other movement, substantially as described.

11. In an appliance of the character described, the combination of a wheeled-truck, a lifting-jack on said truck, a handle, a mounting for said handle permitting it to swing in a vertical plane and to turn on its own axis, means connecting said handle with said jack whereby the vertical movements of the handle operate the jack, and means connecting said handle to a wheel of the truck whereby the turning of the handle on its own axis turns said wheel, substantially as described.

12. In an appliance of the character described, the combination of a wheeled-truck, a lifting-jack mounted thereon, a handle fulcrumed on the truck, means connecting said handle to the jack whereby rocking of the handle on the fulcrum operates the jack, and means connecting said handle to a steering wheel of the truck whereby turning of the handle on its own axis steers the wheel, said latter connecting means having a joint normally in register with the axis of said fulcrum whereby rocking of the handle to operate the jack does not affect the steering connection, substantially as described.

13. In an appliance of the character described, the combination of a lifting-jack, a hinged handle to operate said jack adapted to be swung in a vertical plane, and means to automatically rock said handle to an elevated position when released, regardless of the condition of the jack, substantially as described.

14. In an appliance of the character described, the combination of a truck, carrying wheels for said truck, a lifting-jack, on said truck, a hinged handle, means connecting said handle with a wheel of the truck whereby steering of the wheel may be effected by the handle, and means to automatically rock said handle to an elevated position when released, regardless of the condition of the lifting jack, substantially as described.

15. In an appliance of the character described, the combination of a truck, carrying-wheels for said truck, a lifting-jack, on said truck a handle, means permitting the handle to rock in a vertical plane and actuate said jack and to turn on its own axis and steer a wheel of the truck, and a spring to automatically rock said handle to elevated position when released, substantially as described.

16. In a lifting-jack construction of the character described, the combination of a lifting-sleeve, means to hold said sleeve against rotation, means to raise and lower said sleeve, a load-supporting post telescopically received in said sleeve, means to hold said post at a plurality of adjusted heights in said sleeve, a load-engaging saddle swiveled on said post, and means to temporarily clutch said saddle and post together, said post having a turning movement in said sleeve, substantially as described.

17. In a lifting-jack construction of the character described, the combination of a lifting-sleeve provided with a plurality of recesses at different heights, means to raise and lower said sleeve, a load-supporting post slidable in said sleeve and having a cavity, a spring in said cavity, and a catch in said cavity pressed outwardly by said spring, said catch being adapted to support said post in said sleeve by residing partly in one of said sleeve recesses and in said post cavity, substantially as described.

18. In a lifting-jack construction of the character described, the combination of a lifting-sleeve having a plurality of holes at different heights, means to raise and lower said sleeve, a load-supporting post slidable in said sleeve and having an inclined cavity, a coil-spring in said cavity, a ball in said cavity pressed outwardly by said spring and of larger diameter than said sleeve holes, said post being adapted to be supported at various elevations by said ball residing partly in said post cavity and partly in the sleeve hole corresponding to the desired height, substantially as described.

19. In a lifting-jack of the character described, the combination of a lifting-sleeve having a plurality of holes of different heights, means to raise and lower said sleeve, a load-supporting post slidable in said sleeve and having an inclined cavity, a coil-spring in said cavity, a ball in said cavity pressed outwardly by said spring and of larger diameter than said sleeve holes, said post being adapted to be supported at various elevations by said ball residing partly in said post cavity and partly in the sleeve hole corresponding to the desired height, a load-engaging saddle swiveled and slidable on said post, a washer fixed on said post preventing removal of the saddle from the post, and a normally inoperative clutch connection between said saddle and washer adapted to clutch said parts together when the saddle is slid on the post, substantially as described.

20. In a lifting-jack construction of the character described, the combination of a lifting-sleeve provided with a plurality of recesses at different heights, means to raise and lower said sleeve, means to prevent said sleeve from turning, a load-supporting post slidable in said sleeve and having a cavity, a spring in said cavity, a catch in said cavity pressed outwardly by said spring said catch being adapted to support said post in said sleeve by residing partly in one of the sleeve recesses and in the post cavity, said post having a limited turning movement permitting said catch to be shifted into and out of alignment with said sleeve recesses, substantially as described.

21. In a lifting-jack construction of the character described, the combination of a lifting-sleeve having a plurality of holes in a straight line and at different heights, means to prevent said sleeve from turning, means to raise and lower said sleeve, a load-supporting post slidable in said sleeve and having an inclined cavity, a coil spring in said cavity, a ball in said cavity pressed outward by said spring and of larger diameter than said sleeve hole, said post being adapted to be supported at various elevations by said ball residing partly in said post cavity and partly in the sleeve hole corresponding to the desired height, means permitting said post to have a limited turning movement to bring said ball into and out of register with said line of sleeve holes, a load engaging saddle swiveled and slidable on said post, a washer fixed on said post preventing removal of the saddle from the post, and a normally inoperative clutch connection between said saddle and washer adapted to clutch such parts together when the saddle is slid on the post, substantially as described.

22. In a lifting-jack construction of the character described, the combination of a wheeled-truck, means on said truck to engage the load, means to raise said load-engaging means comprising a bell-crank fulcrumed on said truck, a lifting-dog carried by said bell-crank, a socket fulcrumed on said truck; a rod connecting said socket and bell-crank, and an operating-handle journaled in said socket, and a steering connection between said handle and one or more of the wheels of the truck, substantially as described.

23. In a lifting-jack construction of the character described, the combination of a main supporting member, a toothed load lifting and lowering member, a lifting-dog adapted to co-act with said teeth, a retaining-dog adapted to co-operate with said teeth, a handle fulcrumed on said supporting member, an operating connection between said handle and lifting-dog, and means controllable at the free end of said handle adapted to release said retaining-dog, substantially as described.

24. In a lifting-jack construction of the character described, the combination of a wheeled-truck, a toothed load lifting and lowering member, a lifting-dog adapted to co-act with the teeth of said member, a retaining-dog adapted to co-operate with said teeth, a handle fulcrumed on said truck, an operating connection between said handle and lifting-dog, means controllable at the free end of said handle adapted to release said retaining-dog, and means connecting said handle with a wheel of said truck whereby steering of the latter may be effected, substantially as described.

25. In a lifting-jack construction of the character described, the combination of a main-supporting member, a toothed load lifting and lowering element, a lifting and lowering dog co-acting with the teeth of said element, a retaining-dog adapted to co-operate with said teeth, a handle fulcrumed on said main-supporting member, an operating connection between said handle and said lifting and lowering dog, a release member co-operating with both dogs, and means to actuate said release member operable from the free end of said handle, substantially as described.

26. In a lifting-jack construction of the character described, the combination of a wheeled-truck, a toothed load lifting and lowering element, a lifting and lowering dog co-acting with the teeth of said element, a retaining-dog adapted to co-operate with said teeth, a handle fulcrumed on said main supporting element, an operating connection between said handle and said lifting and lowering dog, a release member co-operating with both dogs, means to actuate said release member operable from the free end of said handle, and means connecting said handle to one or more wheels of said truck whereby steering of the latter may be effected, substantially as described.

27. In a lifting-jack construction of the character described, the combination of a main supporting member, a toothed load lifting and lowering element, a lifting and lowering dog co-acting with the teeth of said element, a retaining-dog adapted to co-operate with said teeth, a handle fulcrumed on said main supporting member, an operating connection between said handle and said lifting and lowering dog, a release member co-operating with both dogs and having a cam surface with which a part of the lifting and lowering dog co-operates, and means to actuate said release member operable from the free end of said handle, substantially as described.

28. In a lifting-jack construction of the character described, the combination of a main-supporting member, a toothed load lifting and lowering element, a lifting and lowering dog co-acting with the teeth of said element, a retaining-dog adapted to co-operate with said teeth, a handle fulcrumed on said main supporting member, an operating connection between said handle and said lifting and lowering dog, a link supported release member co-operating with both dogs, and means to actuate said release member operable from the free end of said handle, substantially as described.

29. A vehicle roller jack comprising a horizontally extending frame, carrying wheels supporting said frame, a lifting member in the form of a housing movable up and down with respect to said frame, a rack bar slidable vertically in said lifting member, a load supporting member revolubly mounted on a vertical axis on said rack bar independently of said housing, a lever mounted on said frame at a distance from said lifting member, means comprising pawl and ratchet mechanism operatively connecting said lever with said lifting member and adapted by a plurality of strokes of the lever to give the lifting member a vertical movement on said frame and means actuated by upward movement of the housing for moving the rack bar upwardly.

IRA A. WEAVER.
ROLLA G. STOEHR.